United States Patent
Rabinovici et al.

(10) Patent No.: US 7,571,439 B1
(45) Date of Patent: Aug. 4, 2009

(54) SYNCHRONIZING ACCESS TO GLOBAL RESOURCES

(75) Inventors: Sorana Rabinovici, Woodland Hills, CA (US); Kenneth Nishihara, Cerritos, CA (US)

(73) Assignee: Teradata US, Inc., Miamisburg, OH (US)

( * ) Notice: Subject to any disclaimer, the term of this patent is extended or adjusted under 35 U.S.C. 154(b) by 1147 days.

(21) Appl. No.: 10/160,753

(22) Filed: May 31, 2002

(51) Int. Cl.
G06F 9/46 (2006.01)
G06F 17/30 (2006.01)
G06F 12/00 (2006.01)

(52) U.S. Cl. .................. 718/104; 718/102; 707/8; 710/200

(58) Field of Classification Search .......... 718/1, 718/100–108; 713/400; 707/1–8; 710/200
See application file for complete search history.

(56) References Cited

U.S. PATENT DOCUMENTS

| | | | | |
|---|---|---|---|---|
| 5,644,768 A * | 7/1997 | Periwal et al. | ............. | 718/102 |
| 5,761,670 A * | 6/1998 | Joy | ............. | 707/103 R |
| 5,832,484 A * | 11/1998 | Sankaran et al. | ............. | 707/8 |
| 5,862,376 A * | 1/1999 | Steele et al. | ............. | 718/107 |
| 5,875,461 A * | 2/1999 | Lindholm | ............. | 711/118 |
| 6,023,721 A * | 2/2000 | Cummings | ............. | 709/201 |
| 6,105,057 A * | 8/2000 | Kuftedjian et al. | ............. | 709/213 |
| 6,195,676 B1 * | 2/2001 | Spix et al. | ............. | 718/107 |
| 6,223,204 B1 * | 4/2001 | Tucker | ............. | 718/103 |
| 6,247,025 B1 * | 6/2001 | Bacon | ............. | 707/206 |
| 6,353,898 B1 * | 3/2002 | Wipfel et al. | ............. | 714/48 |
| 6,418,526 B1 * | 7/2002 | Denman et al. | ............. | 712/16 |
| 6,499,048 B1 * | 12/2002 | Williams | ............. | 718/102 |
| 6,510,460 B1 * | 1/2003 | Callsen et al. | ............. | 709/223 |
| 6,526,457 B1 * | 2/2003 | Birze | ............. | 719/328 |
| 6,574,654 B1 * | 6/2003 | Simmons et al. | ............. | 718/104 |
| 6,606,742 B1 * | 8/2003 | Orton et al. | ............. | 717/140 |
| 6,662,252 B1 * | 12/2003 | Marshall et al. | ............. | 710/200 |
| 6,662,364 B1 * | 12/2003 | Burrows et al. | ............. | 718/102 |
| 6,681,225 B1 * | 1/2004 | Uceda-Sosa et al. | ............. | 707/8 |
| 6,738,947 B1 * | 5/2004 | Maeda | ............. | 714/785 |
| 6,990,560 B2 * | 1/2006 | Armstrong et al. | ............. | 711/152 |
| 7,058,948 B2 * | 6/2006 | Hoyle | ............. | 718/104 |
| 7,376,744 B2 * | 5/2008 | Loaiza et al. | ............. | 709/229 |
| 2002/0087736 A1 * | 7/2002 | Martin | ............. | 709/312 |
| 2003/0041173 A1 * | 2/2003 | Hoyle | ............. | 709/248 |
| 2006/0212573 A1 * | 9/2006 | Loaiza et al. | ............. | 709/225 |

OTHER PUBLICATIONS

"JAVA Treads", Scott Oaks & Henry Wong, Copyright 1997, O'reilly & Associates, pp. 48, and 163-165.*
"Computer Dictionary", Microsoft Press, Copyright 1994 by microsoft Press, p. 190.*
Greenwald et al., "The Synergy Between Non-Blocking Synchronization and Operating System Structure", USENIX Association, 1996, pp. 123-136.*

* cited by examiner

Primary Examiner—Lewis A Bullock, Jr.
Assistant Examiner—Jennifer N To
(74) Attorney, Agent, or Firm—Howard Speight

(57) ABSTRACT

A method, data structure, and database system for synchronizing access to a global resource by a plurality of processes executing on a computer system are disclosed. A global lock is defined for the global resource and a local instantiation of the global lock is defined for each of the plurality of processes that will access the global resource.

16 Claims, 4 Drawing Sheets

SYNCHRONIZING ACCESS TO GLOBAL RESOURCES

BACKGROUND

Computer systems frequently have many processes running simultaneously and frequently one or more of those processes include more than one processing threads. In many cases, it is important for one or more of the processes (or threads) to share access to a resource, sometime called a "global resource," such as a disk drive or a memory element.

Access to global resources is typically controlled, or synchronized, to prevent unpredictable results such as might result, for example, when one process writes to a global resource at the same time that another process reads from the global resource. Computer systems frequently use "locks" to exercise the required control. A "mutex" is an example of such a lock.

Different operating systems use different techniques to synchronize access to global resources. In WINDOWS, for example, for a process to establish a known mutex object the process must create the mutex object as a uniquely named entity. In contrast, if a mutex is declared under Unix in global memory, and it is initialized with shared attributes, the mutex may be accessible to all processes through pointers to the mutex in the global area.

It is desirable for the same application to run under different operating systems without requiring major modifications. Frequently, applications use the facilities provided by the operating systems to synchronize access to global resources. The different global resource synchronization techniques used by different operating systems, such as those described above, make writing applications with locking primitives that may be run on multiple operating systems a challenge.

SUMMARY

In general, in one aspect, the invention features a method for synchronizing access to a global resource by a plurality of processes executing on a computer system. The method includes defining a global lock for the global resource and defining a local instantiation of the global lock for each of the plurality of processes that will access the global resource.

Implementations of the invention may include one or more of the following. Defining a global lock for the global resource may include defining a first global lock data structure if the global lock is defined under the first operating system and defining a second global lock data structure if the global lock is defined under the second operating system. The first operating system may be WINDOWS and the first global lock data structure may include a unique name and a handle for a mutex. The second operating system may be Unix and the second global lock data structure may include a mutex. If the first operating system is WINDOWS, the global lock may have a global handle and the local instantiation for the global lock may include a local handle linked to the global handle. If the second operating system is Unix, the global lock may have a mutex and the local instantiation for the global lock may include a pointer to the mutex.

In general, in another aspect, the invention features a data structure for use in synchronizing access to a global resource by a plurality of processes. The data structure includes a global portion and a local portion.

In general, in another aspect, the invention features a database system including a massively parallel processing system which includes one or more nodes. The system also includes a plurality of CPUs, each of the one or more nodes providing access to one or more CPUs. The system also includes a plurality of virtual processes each of the one or more CPUs providing access to one or more virtual processes. The systems also includes a global resource. The system also includes a process for synchronizing access to the global resource. The process includes defining a global lock for the global resource and defining a local instantiation of the global lock for each of the plurality of processes that will access the global resource.

DETAILED DESCRIPTION

A system for synchronizing access to global resources by a plurality of processes executing on a computer system includes a virtual locking mechanism, which will work in a plurality of operating systems, such as, for example, Unix and WINDOWS. The virtual locking mechanism has two linked parts: a global portion that is globally accessible, and a local portion that resides in a process private area, which is accessible only to the local process. While the method will be described using Unix and WINDOWS as the operating systems being employed, it will be understood that the same principles will apply to synchronizing access to a global resource by multiple processes under other operating systems, such as OS.

Figure 1:
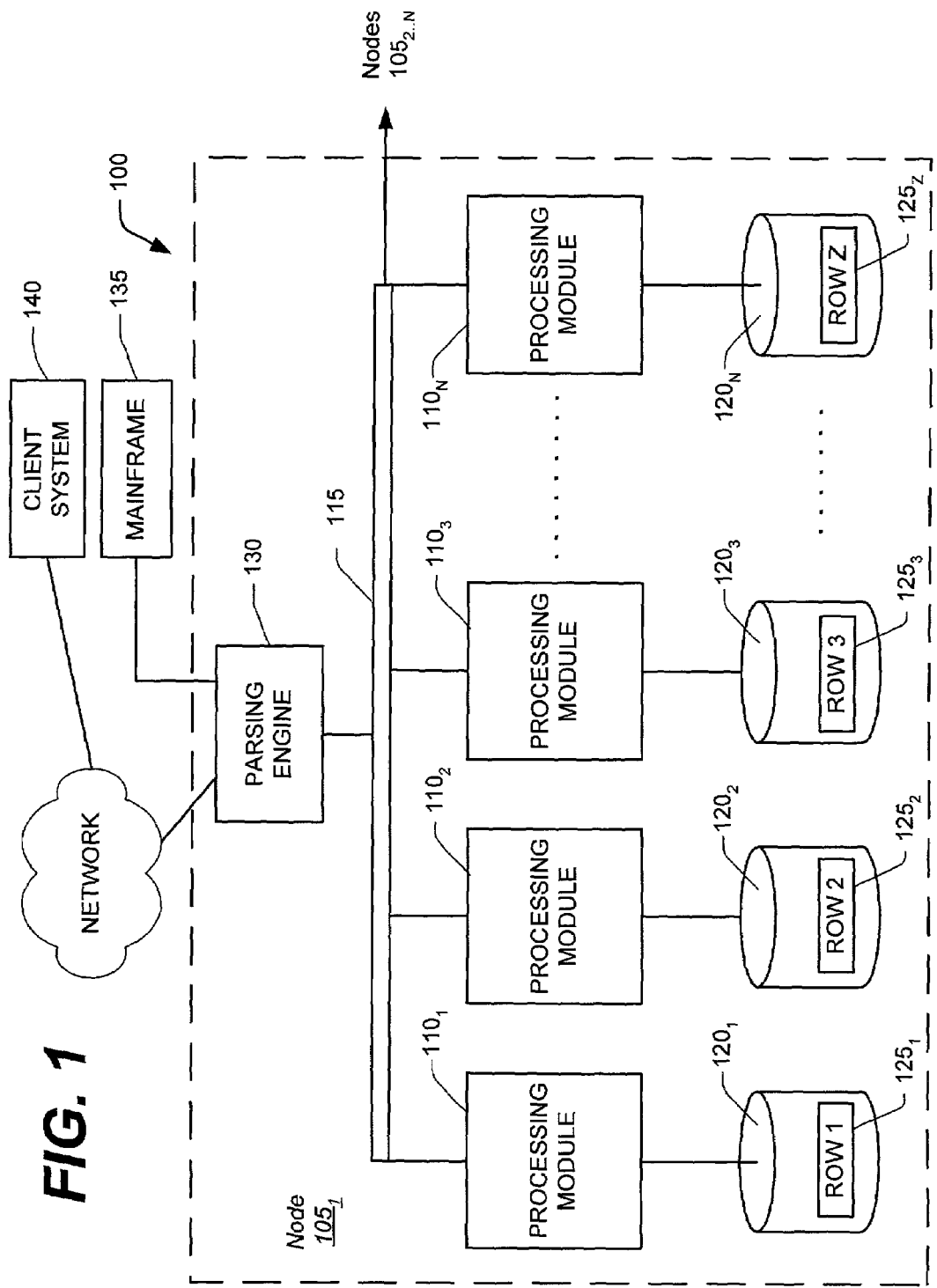
FIG. 1 is a block diagram of a node of a database system.

The access synchronization technique disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node 105$_1$ of the DBS 100. The DBS node 105$_1$ includes one or more processing modules 110$_{1 \ldots N}$, connected by a network 115, that manage the storage and retrieval of data in data-storage facilities 120$_{1 \ldots N}$. Each of the processing modules 110$_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules 110$_{1 \ldots N}$ manages a portion of a database that is stored in a corresponding one of the data-storage facilities 120$_{1 \ldots N}$. Each of the data-storage facilities 120$_{1 \ldots N}$ includes one or more disk drives. The DBS may include multiple nodes 105$_{2 \ldots N}$ in addition to the illustrated node 105$_1$, connected by extending the network 115.

The system stores data in one or more tables in the data-storage facilities $120_1 \ldots_N$. The rows $125_1 \ldots_Z$ of the tables are stored across multiple data-storage facilities $120_1 \ldots_N$ to ensure that the system workload is distributed evenly across the processing modules $110_1 \ldots_N$. A parsing engine 130 organizes the storage of data and the distribution of table rows $125_1 \ldots_Z$ among the processing modules $110_1 \ldots_N$. The parsing engine 130 also coordinates the retrieval of data from the data-storage facilities $120_1 \ldots_N$ in response to queries received from a user at a mainframe 135 or a client computer 140. The DBS 100 usually receives queries and commands to build tables in a standard format, such as SQL.

In one implementation, the rows $125_1 \ldots_Z$ are distributed across the data-storage facilities $120_1 \ldots_N$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_1 \ldots_N$ and associated processing modules $110_1 \ldots_N$ by a hash bucket map. The characteristics of the columns chosen for the primary index determine how evenly the rows are distributed.

Figure 2:
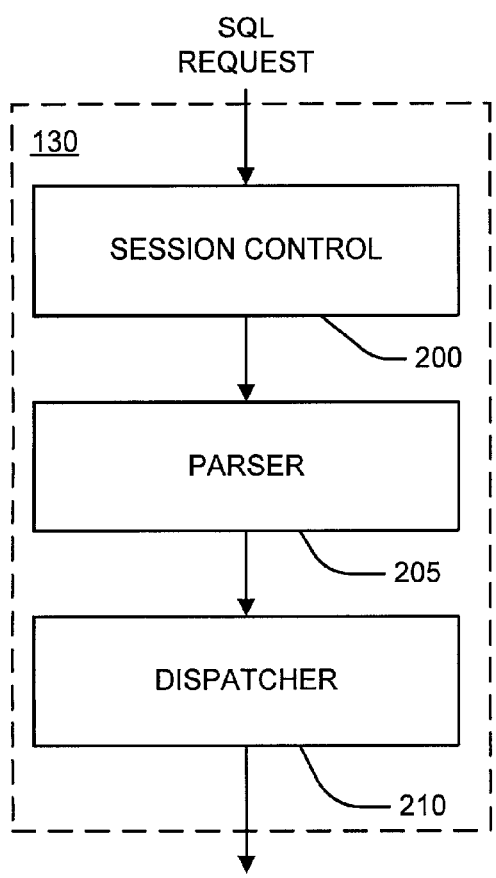
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
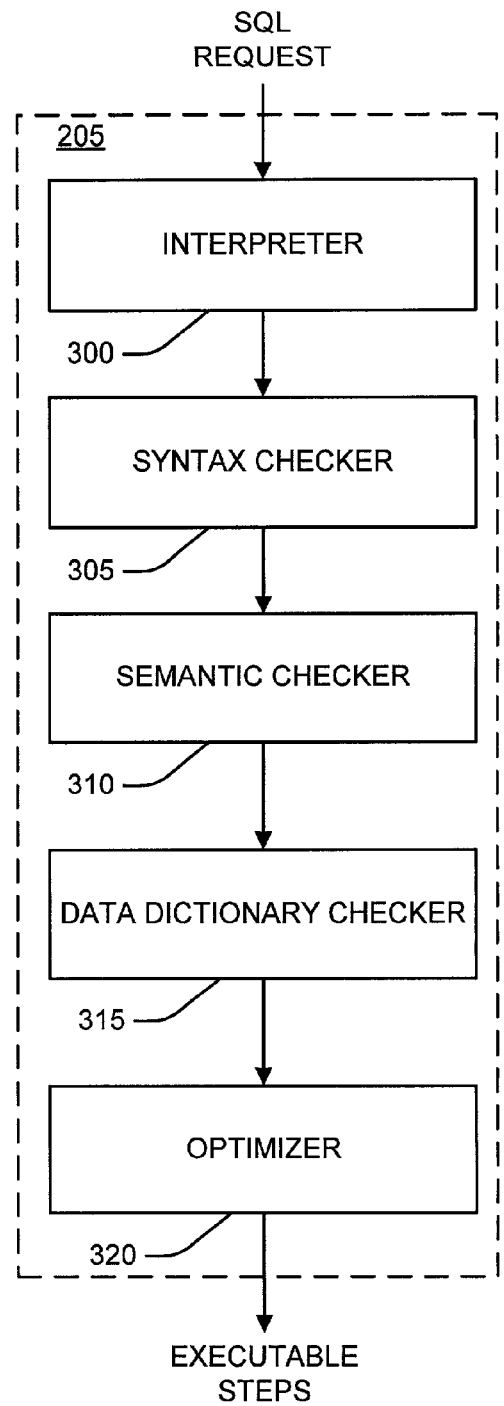
FIG. 3 is a flow chart of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request.

"Global locks" are used for synchronization between threads of different processes while "process locks" are used for synchronization between threads of the same process. Therefore, global locks are used for node and virtual processor level synchronization while process locks are used for intra-process level synchronization. Global locks are created at node and virtual processor initialization time. The startup code for each process will open the list of global locks, storing the local handles to be used by operations involving these locks. On the other hand, process locks can be created any time before the lock is used in the process but most likely they are created in the startup code for each process.

In WINDOWS, global locks use a mutex object. In Unix, user level locks are implemented using pthread_mutex_t objects and global locks use those.

Each subsystem that requires node level synchronization defines a global lock in the subsystem's node global area when the subsystem's node global area is initialized. The subsystem calls virtualgloballockcreate, a function that creates a global lock, passing a pointer to the global lock defined in the node global area.

Figure 4:
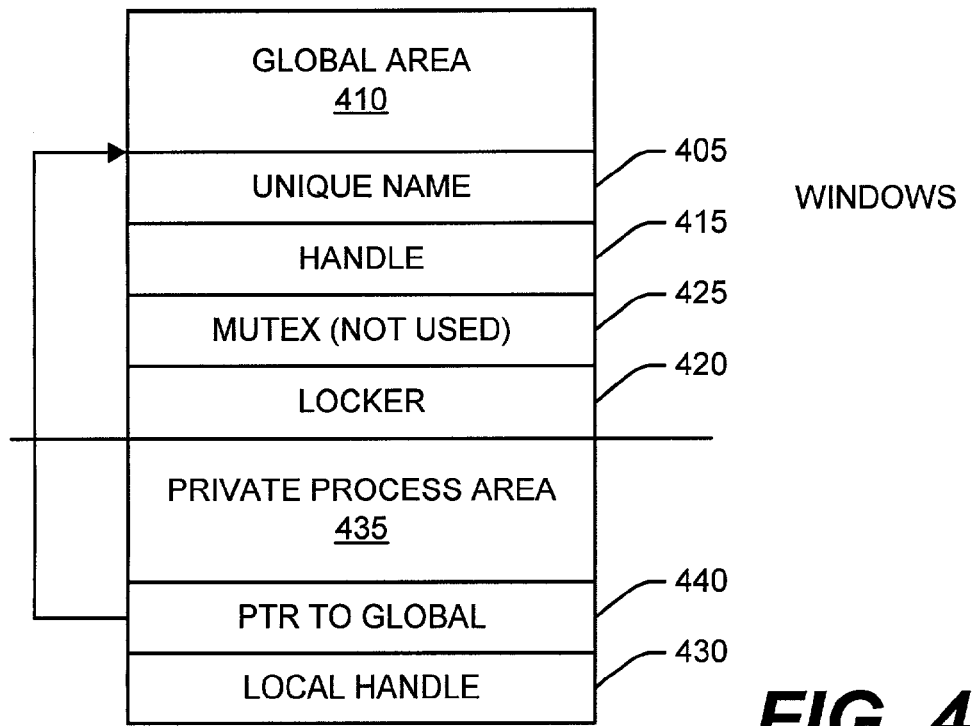
FIG. 4 illustrates a virtual lock created under WINDOWS

WINDOWS, virtualgloballockcreate creates a mutex, with a unique name 405, in the node global area 410, as illustrated in FIG. 4. A handle 415, which is returned from virtualgloballockcreate, is saved for freeing the global lock. Also the process id 420 of the process that locks this global lock is saved for debugging purpose. Any process that will reference this mutex needs a local handle. An example data structure for the resulting global portion of the lock is illustrated below:

```
typedef struct
{
    char        name[32];
    HANDLE      ihandle;
    pid_t       locker;
}
virtualgloballock_t
```

The data structure may also include a mutex field 425, which is not used in WINDOWS. Alternatively, the mutex and handle fields may be combined as a mutex/handle field, used as a handle field under WINDOWS and a mutex field under Unix, as discussed below.

Figure 5:
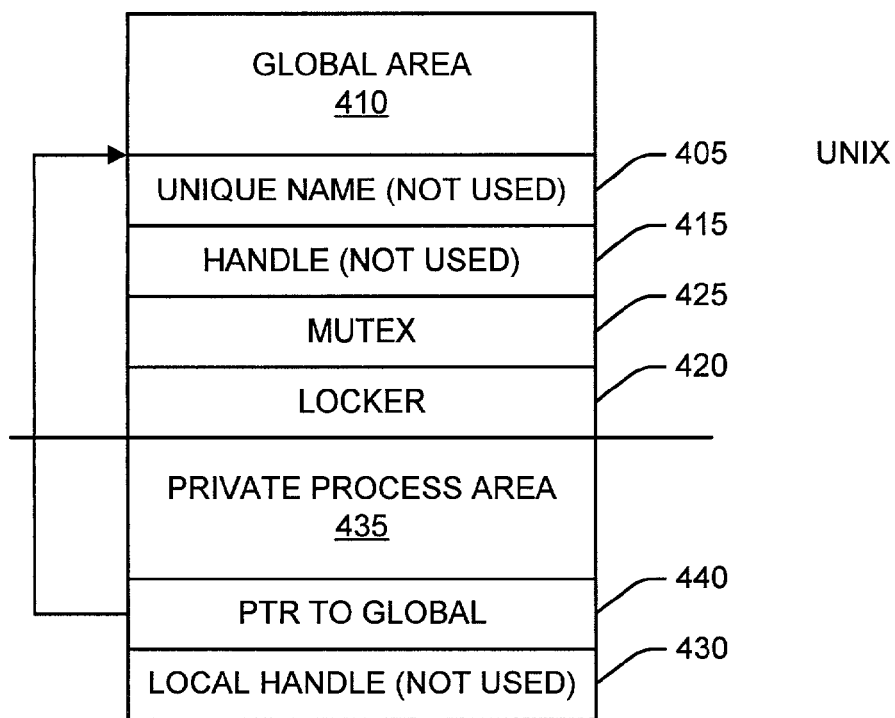
FIG. 5 illustrates a virtual lock created under Unix.

In Unix, virtualgloballockcreate creates and initializes a mutex by calling pthread_mutex_init passing the pointer 425 to the global lock in node global area 410, as illustrated in FIG. 5. Since the scope of these locks is not limited to the process context, the attribute of the locks must be set as PROCESS_SHARED. The process id 610 of the process that locked this global lock is saved for debugging purpose. An example data structure for the resulting global portion of the lock is illustrated below:

```
typedef struct
{
    pthread_mutex_t   lock;
    pid_t             locker;
}
virtualgloballock_t
```

In this data structure, the unique name field 405 and the handle field 415, if separate from the mutex field, are not used. Note that the WINDOWS data structure is different from the Unix data structure. Alternatively, the difference in the data structure may be that some of the fields are not used under respective operating systems, as illustrated in FIGS. 4 and 5. For example, the unique name field may be present, but not used, in the Unix data structure.

When the process local storage specific to the subsystem is initialized as part of process initialization, virtualgloballockinit is called to create a local reference, or local instantiation, for a global lock passing a global lock pointer and a local lock pointer.

In WINDOWS, virtualgloballockinit calls OpenMutex passing the unique name 405 of the mutex saved in the global lock. A local handle 430 used to reference the lock is returned and saved in the local lock in the private process area 435. A pointer to the global lock is also provided and saved in the private process area 435 in field 440. An example data structure for the resulting local portion of the lock is illustrated below:

```
typedef struct
{
    virtualgloballock_t   *glockp;
    HANDLE                lhandle;
}
virtualgloballocklocal_t
```

In Unix, it is only necessary for virtualgloballockinit to set the pointer 440 to the global lock in the local lock, as shown in FIG. 5. Unix does not use the local handle field 430 used by WINDOWS.

The local portion of the lock may have the same data structure under different operating systems, as shown immediately above, or alternatively, the data structure may be modified to eliminate unnecessary fields.

When a process needs to protect access to shared node global data (most likely in the subsystem's node global area) or another shared global resource, virtualgloballock is called passing a pointer to the local lock.

In WINDOWS, virtualgloballock calls WaitForSingleObject, passing the local handle which is saved in the local lock in field 430, to wait for the mutex and acquire if successful. When the mutex is acquired, the process id of the locker is saved in the node global lock in field 420.

In Unix, virtualgloballock calls pthread_mutex_lock, passing the global lock pointer which is saved in the local lock in field 440, to wait for the mutex and acquire if successful. When the mutex is acquired, the process id of the locker is saved in the node global lock in field 420.

When a subsystem finishes access to the shared node global data, virtualglobalunlock is called, passing a pointer to the local lock pointer to release the node global lock.

In WINDOWS, virtualglobalunlock calls ReleaseMutex, passing the local handle saved in the local lock, to release the held mutex. When the mutex is released, the process id of the locker saved in the node global lock in field 420 is initialized to zero.

In Unix, virtualglobalunlock calls pthread_mutex_unlock, passing the global lock pointer saved in the local lock, to release held mutex. When the mutex is released, the process id of the locker saved in the node global lock in field 420 is initialized to zero.

When the process local storage specific to the subsystem is freed as part of process free up, virtualgloballockfree is called to free up a local reference for a global lock passing the local lock pointer.

In WINDOWS, virtualgloballockfree frees up a local reference to the mutex by closing the local handle saved in the local lock in field 430.

In Unix, virtualgloballockfree frees up a local reference to the mutex by initializing the pointer to the global lock saved in the local lock in field 440.

A global lock defined in the subsystem's node global area when the subsystem's node global area is initialized is freed when the node global area for the subsystem is freed. The subsystem calls virtualgloballockdestroy passing a pointer to the global lock.

In WINDOWS, virtualgloballockdestroy calls CloseHandle, passing the handle saved in the global lock in field 415, to destroy the mutex.

In Unix, virtualgloballockdestroy calls pthread_mutex_destroy, passing the global lock pointer, to destroy the mutex.

Lock and unlock functions for the virtual lock, virtualgloballock and virtualglobalunlock, respectively, reference the local portion of the lock and are tailored to the operating system environment. Thus, applications may be written using virtualgloballock and virtualglobalunlock without regard for the operating system environment.

Figure 6:
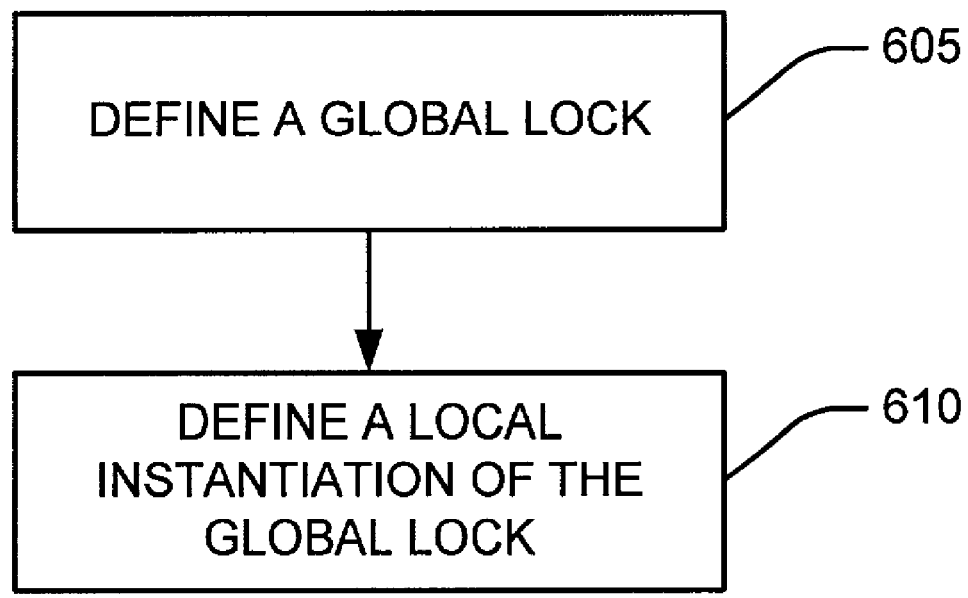
FIG. 6 is a flow chart for creating a global lock.

The process for establishing the virtual lock, illustrated in FIG. 6, includes defining a global lock (block 605), which is the global portion of the virtual lock. A local instantiation of the global lock, which is the local portion of the virtual lock, is then defined for each process that will access the global resource (block 610).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method, implemented in a computer, for synchronizing access to a global resource by a plurality of processes executing on a computer system, the global resource including at least one of a disk drive or memory element, the method including:
   defining a global lock for the global resource where defining a global lock for the global resource includes: defining a first global lock data structure if the global lock is defined under a first operating system, and defining a second global lock data structure if the global lock is defined under a second operating system;
   defining a separate local instantiation of the global lock for each of a plurality of processes that will access the global resource of a plurality of processes executing on a single node of the computer system, there being a one-to-one relationship between processes that will access the global resource and local instantiations of the global lock, and wherein
   each of the plurality of processes is configured to access its separate local instantiation of the global lock to access the global resource.

2. The method of claim 1 where:
   the first operating system is WINDOWS; and
   the first global lock data structure includes:
      a unique name; and
      a handle for a mutex.

3. The method of claim 1 where:
   the second operating system is Unix; and
   the second global lock data structure includes a mutex.

4. The method of claim 1 where the plurality of processes are executed under an operating system, and where:
   the operating system is WINDOWS;
   the global lock has a global handle; and
   the separate local instantiation for the global lock includes a local handle linked to the global handle.

5. The method of claim 1 where the plurality of processes are executed under an operating system, and where:
   the operating system is Unix;
   the global lock has a mutex; and
   the separate local instantiation for the global lock includes a pointer to the mutex.

6. A computer program, stored in a tangible medium, including executable instructions for accessing a data structure, the data structure for use in synchronizing access to a global resource by a plurality of processes, the global resource including at least one of a disk drive or memory element, the data structure including:
   a global portion; and
   a separate local portion corresponding to the global portion for each of a plurality of processes that will access a global resource of a plurality of processes executing on a single node on a computer system, there being a one-to-one relationship between each of the processes that will access the global resource and one of the separate local portions, wherein the separate local portion has a first local lock data structure if it is defined under a first operating system;

the separate local portion has a second local lock data structure if it is defined under a second operating system; and wherein the data structure is stored in memory.

7. The computer program of claim 6 where:

the global portion has a first global lock data structure if it is defined under a first operating system; and the global portion has a second global lock data structure if it is defined under a second operating system.

8. The computer program of claim 7 where:

the first operating system is WINDOWS; and the first global lock data structure includes:
- a unique name; and
- a handle for a mutex.

9. The computer program of claim 7 where:

the second operating system is Unix; and the second global lock data structure includes a mutex.

10. The computer program of claim 6 where:

the first operating system is WINDOWS;

the first local lock data structure includes:
- a local handle tied to a global handle for the global portion.

11. The computer program of claim 6 where:

the second operating system is Unix; and the second local lock data structure includes a pointer to the global portion.

12. A database system including:

a massively parallel processing system including one or more nodes;

a plurality of CPUs, each of the one or more nodes providing access to one or more CPUs;

a plurality of virtual processes executing on a single node, each of the one or more CPUs providing access to one or more virtual processes;

a global resource including at least one of a disk drive or memory element;

wherein at least one of the plurality of CPUs is configured to synchronize access to the global resource, where when synchronizing access to the global resource, at least one of the plurality of CPUs:

defines a global lock for the global resource where defines a global lock for the global resource includes: defines a first global lock data structure if the global lock is defined under a first operating system, and defines a second global lock data structure if the global lock is defined under a second operating system;

defines a separate local instantiation of the global lock for each of a plurality of processes of the plurality of processes that will access the global resource, there being a one-to-one relationship between processes that will access the global resource and local instantiations of the global lock; and wherein each of the plurality of processes is configured to access its local instantiation of the global lock to access the global resource.

13. The database system of claim 12 where:

the first operating system is WINDOWS; and the first global lock data structure includes:
- a unique name; and
- a handle for a mutex.

14. The database system of claim 12 where:

the second operating system is Unix; and the second global lock data structure includes a mutex.

15. The database system of claim 12 where the plurality of processes are executed under an operating system, and where:

the operating system is WINDOWS;

the global lock has a global handle; and the separate local instantiation for the global lock includes a local handle linked to the global handle.

16. The database system of claim 12 where the plurality of processes are executed under an operating system, and where:

the operating system is Unix;

the global lock has a mutex; and the separate local instantiation for the global lock includes a pointer to the mutex.

* * * * *